United States Patent
Herrmann et al.

(10) Patent No.: US 10,482,727 B2
(45) Date of Patent: Nov. 19, 2019

(54) ELECTRIC DEVICES WITH STAND LIGHTING SYSTEMS

(71) Applicant: Motorola Mobility LLC, Chicago, IL (US)

(72) Inventors: Andrew Herrmann, Inverness, IL (US); Marcello Zuffo, Chicago, IL (US); ChoonShin You, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 27 days.

(21) Appl. No.: 15/909,160

(22) Filed: Mar. 1, 2018

(65) Prior Publication Data

US 2019/0272719 A1    Sep. 5, 2019

(51) Int. Cl.
    *G08B 5/38*    (2006.01)
    *H04R 1/02*    (2006.01)
    *F21V 8/00*    (2006.01)
(52) U.S. Cl.
    CPC ............... *G08B 5/38* (2013.01); *G02B 6/001* (2013.01); *H04R 1/028* (2013.01)
(58) Field of Classification Search
    CPC ........... G08B 5/38; G02B 6/001; H04R 1/028
    See application file for complete search history.

(56) References Cited

U.S. PATENT DOCUMENTS

| | | | | |
|---|---|---|---|---|
| 9,667,871 | B2 * | 5/2017 | Lombardi | H04N 5/23293 |
| 2008/0199036 | A1 * | 8/2008 | Tsai | H04R 1/028 |
| | | | | 381/386 |
| 2015/0178539 | A1 * | 6/2015 | Gerst, III | G06K 7/10881 |
| | | | | 235/472.02 |
| 2016/0372973 | A1 * | 12/2016 | Fitzgerald | H02J 50/10 |
| 2018/0227668 | A1 * | 8/2018 | Park | H04R 1/44 |
| 2018/0249134 | A1 * | 8/2018 | Siminoff | H04R 1/028 |

OTHER PUBLICATIONS

"Amazon Echo", Amazon Echo (2nd Generation); www.amazon.com; Viewed Feb. 8, 2018; Unknown publication date but prior to filing of present application.
"Apex Medical Technologies", Dip Molding Materials; http://www.apexmedtecho.com/materials.htm; viewed Feb. 8, 2018; Unknown Publication date but prior to filing of present application.
"JBL SoundBoost 2 Speaker", http://www.motorola.com/products; Viewed on Feb. 8, 2018.

* cited by examiner

*Primary Examiner* — Mary Ellen Bowman
(74) *Attorney, Agent, or Firm* — Philip H. Burrus, IV

(57) ABSTRACT

An electronic device includes a housing. A semi-rigid polymer light pipe ring is positioned along the housing. A portion of the semi-rigid polymer light pipe ring extends outwardly beyond a convex major surface of the housing. A substantially planar housing member is coupled to and seals an interior of the semi-rigid polymer light pipe ring.

20 Claims, 8 Drawing Sheets

ELECTRIC DEVICES WITH STAND LIGHTING SYSTEMS

BACKGROUND

Technical Field

This disclosure relates generally to electronic devices, and more particularly to electronic devices having illuminated output devices.

Background Art

Modern portable electronic communication devices pack powerful computing power into very small packages. Illustrating by example, a modern smartphone has more computing power than even the most powerful desktop computer of only a few years ago.

As the computing power in these devices has increased, so too has their feature set. While mobile phones used to be only for making voice calls, today they are used to monitor health and wellness records, transact with social medial, make financial transactions, maintain calendars, surf the web, and more.

This increased functionality can create issues for designers of these devices. For instance, it can be challenging to optimally locate displays, loudspeakers, microphones, and other user interface components for optimal performance in all conditions. It would be advantageous to have an improved electronic device that increased the performance of user interface components.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
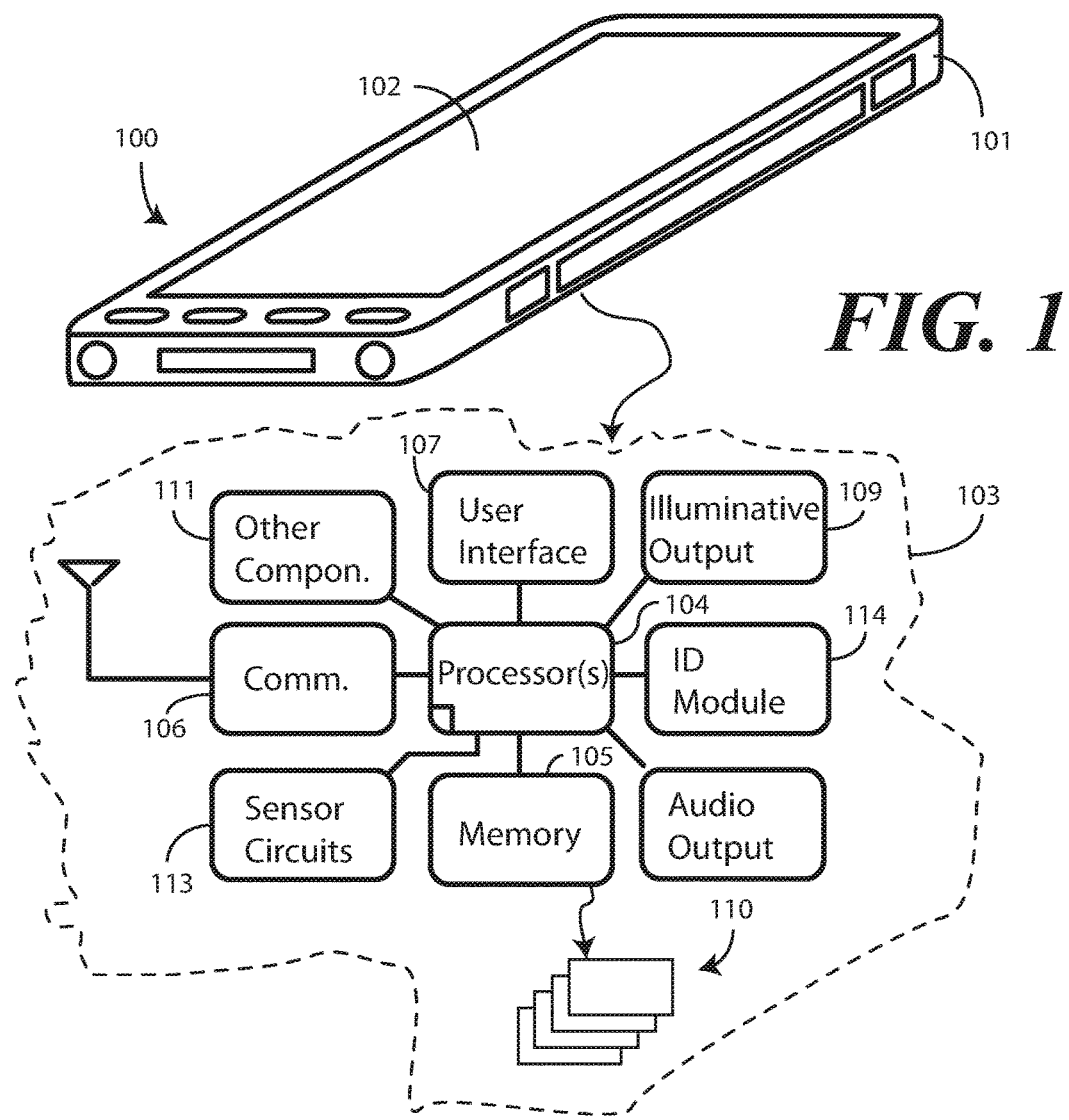
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive.

Also, reference designators shown herein in parenthesis indicate components shown in a figure other than the one in discussion. For example, talking about a device (10) while discussing figure A would refer to an element, 10, shown in figure other than figure A. Further, it is expected that one of ordinary skill, notwithstanding possibly significant effort and many design choices motivated by, for example, available time, current technology, and economic considerations, when guided by the concepts and principles disclosed herein will be readily capable of electronic devices, modular systems, and attachments in accordance with embodiments of the disclosure with minimal experimentation.

As noted above, the increased functionality of modern portable electronic devices can create issues for designers in that it can be challenging to optimally locate user interface components such as displays, loudspeakers, microphones, and imagers. Illustrating by example, people generally desire large, expansive displays defining a major face of the electronic device. This leaves little room for other components such as loudspeakers, microphones, and other input and output components on that side of the device. Placement of such devices on the rear side of prior art electronic devices is problematic. This is true because if a thin, flat, prior art electronic device having a loudspeaker on its rear surface is lying flat on a table, output of that loudspeaker will be sub-optimal due to the acoustic interference occurring between the device housing and the table.

Embodiments of the disclosure advantageously provide a solution to this issue by providing an illuminative output device that can deliver device status indications via light to a user. Such status indications can be via color of light, location of light along the output, frequency of flashing, or by other manipulations of the light. However, as opposed to only serving as an optical output, the illuminative output device also provides vibration isolation for optimal acoustic performance of loudspeakers and microphones of the electronic device. In addition to this secondary benefit, the illuminative output device of the present disclosure further functions as a stand for the electronic device both prevents slippage of the electronic device along a smooth supporting surface and that supports major surfaces above the supporting surface as well.

In one or more embodiments, an electronic device includes a housing. The housing includes a front surface and a rear surface. A display is disposed along a surface, while an illuminative output device is disposed along the rear surface.

In one or more embodiments, the illuminative output device comprises a semi-rigid polymer light pipe disposed along the rear surface. In one or more embodiments, at least a portion of the semi-rigid polymer light pipe extends distally beyond the rear surface such that the portion of the semi-rigid polymer light pipe is "raised" above the rear surface.

One or more light emitting devices are disposed within the housing. One or more processors within the electronic device are operable to control the one or more light emitting devices to deliver status indications via changing the color of light delivered from the one or more light sources, location of light along the semi-rigid polymer light pipe, frequency or pattern of flashing the one or more light sources, or by other manipulations of the one or more light sources. The semi-rigid polymer light pipe receives the light from the one or more light sources and redirects it outside of the housing.

In one or more embodiments, the semi-rigid polymer light pipe is made from a soft, high-friction, semi-compressible polymer such as silicone. In one or more embodiments, the silicone is translucent. This configuration of the semi-rigid polymer light pipe allows the semi-rigid polymer light pipe to perform multiple functions. As noted above, the semi-rigid polymer light pipe receives light from the one or more light emitting devices and redirects it outside of the housing of the electronic device. However, the semi-rigid polymer light pipe performs numerous other functions as well.

In addition to redirecting light, in one or more embodiments the semi-rigid polymer light pipe provides vibration isolation from supporting surfaces to enhance acoustic performance of microphones, loudspeakers, or other acoustic devices of the electronic device. Additionally, the semi-rigid polymer light pipe serves as a stand on a supporting surface that both prevents the electronic device from sliding and that supports the electronic device above the supportive surface such that the exterior surface of the electronic device and the supporting surface do not contact each other.

Moreover, when the rear surface of the electronic device upon which the semi-rigid polymer light pipe is disposed is convex, the semi-rigid polymer light pipe prevents rotation or pivoting of that convex surface relative to the supporting surface. In one or more embodiments, the semi-rigid polymer light pipe is configured as a continuous band. In one or more embodiments, the rear surface of the electronic device is convex exterior to this continuous band. One or more loudspeakers can be placed along the convex surface exterior to the continuous band.

When the rear surface of the electronic device is placed upon a supporting surface, the semi-rigid polymer light pipe serves as a "support island" that holds the convex surface above, and stably on, the supportive surface. Music or other acoustic output delivered by the loudspeakers thus exits the convex housing without interference from the supportive surface, thereby optimizing acoustic sound quality. Advantageously, in one or more embodiments the semi-rigid polymer light pipe serves as a non-slip, vibration isolating, and illuminative notification stand for an electronic device. These many features and advantages are all provided by the semi-rigid polymer light pipe, which itself provides a simple, elegant, compact, and cost-effective solution to several different problems.

In one or more embodiments, the semi-rigid polymer light pipe ports lights from light emitting diodes disposed within the housing of the electronic device. The semi-rigid polymer light pipe redirects this light outward from the housing so that a user can perceive the same. The semi-rigid polymer light pipe is manufactured from a non-slip material in one or more embodiments. When a portion of the semi-rigid polymer light pipe extends beyond the surface of the electronic device, that portion serves as a stand mechanism for the electronic device. This advantageously eliminates the need for any "single purpose" stand to be added, thereby avoiding redundancy, reducing part count, and saving precious "real estate" along the electronic device. As noted, the semi-rigid polymer light pipe also serves as a vibration isolation member for optimal speaker and microphone performance. Other features and advantages of embodiments of the disclosure will be obvious to those of ordinary skill in the art having the benefit of this disclosure.

Turning now to FIG. 1, illustrated therein is one explanatory electronic device 100 in accordance with one or more embodiments of the disclosure. The electronic device 100 of FIG. 1 is shown as a portable electronic device. In one or more embodiments, as described below with reference to FIGS. 2-3, the electronic device 100 is a stand-alone electronic device. However, in other embodiments, such as those described below with reference to FIGS. 5-7, the electronic device 100 is selectively attachable and detachable from an attachment that is operable to provide secondary functionality, such as delivery of acoustic output, visual output, or other output. Where attachable and detachable from the attachment, the combination of the electronic device 100 and the attachment form a modular system.

The electronic device 100 of FIG. 1 is shown illustratively as a smartphone. For simplicity, this embodiment will be described as an illustrative example. However, the electronic device 100 can take other forms as well, including as a palm top computer, a gaming device, a laptop computer, a multimedia player, and so forth. Still other examples of electronic devices will be obvious to those of ordinary skill in the art having the benefit of this disclosure.

In one or more embodiments, the electronic device 100 includes a housing 101. The housing 101 can include one or more housing portions, such as a first housing portion and a second housing portion. In this illustrative embodiment, the housing 101 is disposed about the periphery of a display 102, thereby defining a major face of the electronic device 100.

A block diagram schematic 103 of the electronic device 100 is also shown in FIG. 1. In one embodiment, the electronic device 100 includes one or more processors 104. The one or more processors 104 are operable with the display 102 and other components of the electronic device 100. The one or more processors 104 can include a microprocessor, a group of processing components, one or more Application Specific Integrated Circuits (ASICs), programmable logic, or other type of processing device. The one or more processors 104 can be operable with the various components of the electronic device 100. The one or more processors 104 can be configured to process and execute executable software code to perform the various functions of the electronic device 100.

A storage device, such as memory 105, can optionally store the executable software code used by the one or more processors 104 during operation. The memory 105 may include either or both static and dynamic memory components, may be used for storing both embedded code and user data. The software code can embody program instructions and methods to operate the various functions of the electronic device 100, and also to execute software or firmware applications and modules. The one or more processors 104 can execute this software or firmware, and/or interact with modules, to provide device functionality.

As noted, in one or more embodiments the electronic device 100 includes a display 102, which may optionally be touch-sensitive. In one embodiment where the display 102 is touch-sensitive, the display 102 can serve as a primary user interface 107 of the electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display. However, it should be noted that other types of displays would be obvious to those of ordinary skill in the art having the benefit of this disclosure. In one embodiment, the display 102 includes an electroluminescent layer or light-emitting diode (LED) backlighting layer disposed beneath the display 102 to project light through the display 102. The display 102 can adaptively present text, graphics, images, user actuation targets, data, and controls along the display surface.

In this illustrative embodiment, the electronic device 100 also includes an optional communication circuit 106 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 106 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 106 can include wireless communication circuitry, one of a receiver, a transmitter, or transceiver, and one or more antennas.

The one or more processors 104 can be responsible for performing the primary functions of the electronic device 100. For example, in one embodiment the one or more processors 104 comprise one or more circuits operable with one or more user interface devices, which can include the display 102, to present presentation information to a user. The executable software code used by the one or more processors 104 can be configured as one or more modules 110 that are operable with the one or more processors 104. Such modules 110 can store instructions, control algorithms, and so forth. While these modules 110 are shown as software stored in the memory 105, they can be hardware components or firmware components integrated into the one or more processors 104 as well.

Other components 111 can be included with the electronic device 100. The other components 111 can be operable with the one or more processors 104 and can include input and output components associated with a user interface 107, such as power inputs and outputs, audio inputs and outputs, and/or mechanical inputs and outputs. The other components 111 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. Still other components will be obvious to those of ordinary skill in the art having the benefit of this disclosure.

One or more sensor circuits 113 are operable with the one or more processors 104 in one or more embodiments. The one or more sensor circuits 113 can be configured to sense or determine physical parameters indicative of conditions in an environment about the electronic device 100. Illustrating by example, the physical sensors can include devices for determining information such as motion, bearing, location, acceleration, orientation, proximity to people and other objects, incident light amounts, and so forth. The one or more sensor circuits 113 can include various combinations of microphones, location detectors, motion sensors, physical parameter sensors, temperature sensors, barometers, proximity sensor components, proximity detector components, wellness sensors, touch sensors, cameras, audio capture devices, and so forth.

The one or more sensor circuits 113 can also include a touch pad sensor, a touch screen sensor, a capacitive touch sensor, and one or more switches. The one or more sensor circuits 113 can also include audio sensors and video sensors (such as a camera). The one or more sensor circuits 113 can also include motion detectors, such as one or more accelerometers or gyroscopes. The motion detectors can detect movement, and direction of movement, of the electronic device 100 by a user. The one or more sensor circuits 113 can also be used to detect gestures. For example, the other one or more sensor circuits 113 can include one or more proximity sensors that detect the gesture of a user waving a hand above the display 102. In yet another embodiment, the accelerometer can detect gesture input from a user lifting, shaking, or otherwise deliberately moving the electronic device 100. It should be clear to those of ordinary skill in the art having the benefit of this disclosure that additional sensors can be included as well. Moreover, other types of sensor circuits 113 will be obvious to those of ordinary skill in the art having the benefit of this disclosure.

As noted above, in one or more embodiments the electronic device 100 is a stand-alone electronic device. However, in other embodiments, the electronic device 100 is selectively attachable and detachable from an attachment. Where this is the case, an optional identification module 114 can be configured to determine whether an attachment, the details of which will be described below with reference to subsequent figures, is coupled to the electronic device 100. In one or more embodiments, the identification module 114 can detect not only whether an attachment is coupled to the electronic device 100, but the type of attachment as well.

For example, where the attachment magnetically couples to the electronic device 100, the identification module 114 can determine the number and/or placement of magnetic couplings to detect the type of attachment. Where the attachment mechanically couples to the electronic device 100, in one embodiment the identification module 114 is operable with multiple mechanical connectors to determine which are engaged to identify the attachment. Where the attachment is electrically coupled to the electronic device 100, in one embodiment the identification module 114 can identify the attachment by exchanging electrical signals with a control circuit of the attachment. Other examples of identification techniques will be obvious to those of ordinary skill in the art having the benefit of this disclosure.

One or more auxiliary loudspeakers 108 can optionally be included with the electronic device 100. These auxiliary loudspeakers 108 can be larger than loudspeakers included with the other components 111. For example, one or more smaller loudspeakers may be included with the other components 111 to provide speakerphone capability. However, for audiophiles and people who desire to hear from farther distances, these smaller loudspeakers may be insufficiently optimized for playing music. Thus, to overcome this issue, one or more larger loudspeakers may be included as auxiliary loudspeakers 108 as well.

In one or more embodiments, the electronic device 100 also includes an illuminative output device 109. In one or more embodiments, the illuminative output device 109 comprises a semi-rigid polymer light pipe, which will be described in more detail below with reference to FIGS. 2-4. In an illustrative embodiment, the semi-rigid polymer light pipe is disposed along the rear surface of the electronic device 100. However, in other embodiments the semi-rigid polymer light pipe can be disposed along a minor surface of the electronic device 100, such as the sides. Alternatively, in another embodiment the semi-rigid polymer light pipe is disposed along the front surface of the electronic device 100. For example, the semi-rigid polymer light pipe could be disposed about a perimeter of the display 102 in one or more embodiments. Other locations suitable for placement of the semi-rigid polymer light pipe will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
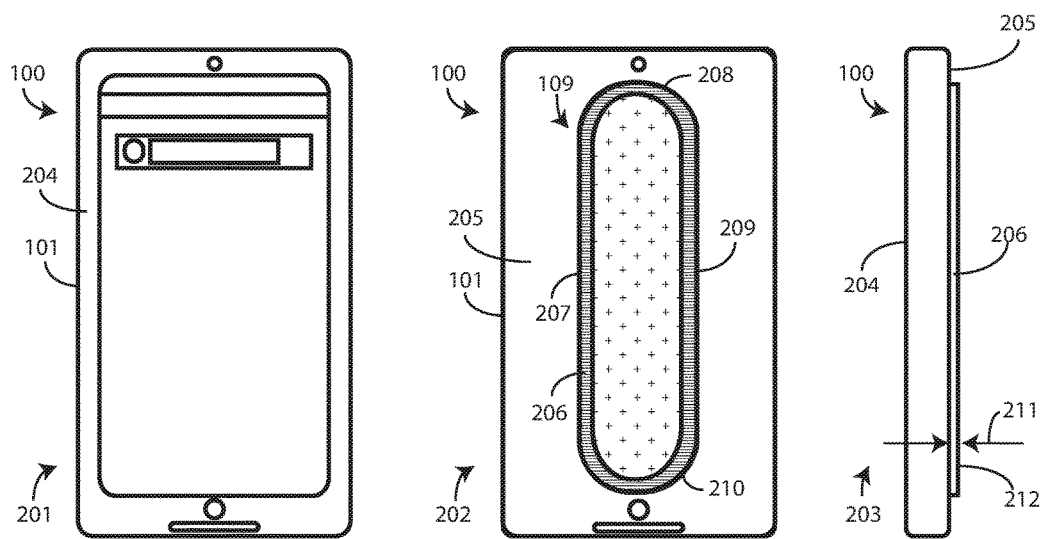
FIG. 2 illustrates front, side, and rear elevation views of one explanatory electronic device in accordance with one or more embodiments of the disclosure.

Turning now to FIG. 2, illustrated therein is a front elevation view 201, a rear elevation view 202, and a side elevation view 203 of the electronic device 100. In the rear elevation view 202 and the side elevation view, the illuminative output device 109 can be seen.

As shown, the housing 101 includes a front surface 204 and a rear surface 205. In this illustrative embodiment, the illuminative output device 109 is disposed along the rear surface 205. In this illustrative embodiment, the illuminative output device 109 comprises a semi-rigid polymer light pipe 206. In this illustrative embodiment, the semi-rigid polymer light pipe 206 is centrally disposed along the rear surface 205 of the housing 101 of the electronic device 100.

In one or more embodiments, the semi-rigid polymer light pipe 206 is manufactured from silicone. In one or more embodiments, the semi-rigid polymer light pipe 206 is manufactured from translucent silicone. In one or more embodiments, the semi-rigid polymer light pipe 206 is manufactured from uncolored, translucent silicone. However, in other embodiments the semi-rigid polymer light pipe 206 can be manufactured from colored, translucent silicone as well.

Silicone is advantageous for constructing the semi-rigid polymer light pipe 206 for a variety of reasons. First, silicone is semi-rigid. Second, it has a high frictional coefficient. Third, it is semi-compressible. Fourth, it can be made to be translucent, thereby serving as a light pipe. This configuration of the semi-rigid polymer light pipe allows the semi-rigid polymer light pipe to perform multiple functions. To wit, in addition to receiving, transporting, conducting, and/or redirecting received light, in one or more embodiments the semi-rigid polymer light pipe provides vibration isolation from supporting surfaces to enhance acoustic performance of microphones, loudspeakers, or other acoustic devices of the electronic device. Additionally, the semi-rigid polymer light pipe serves as a stand on a supporting surface that both prevents the electronic device from sliding and that supports the electronic device above the supportive surface such that the exterior surface of the electronic device and the supporting surface do not contact each other.

While silicone is one material suitable for manufacturing the semi-rigid polymer light pipe 206, other materials can be used as well. Illustrating by example, in another embodiment the semi-rigid polymer light pipe 206 is manufactured form polyurethane. In still another embodiment, the semi-rigid polymer light pipe 206 is manufactured from synthetic polyisoprene. In still another embodiment, the semi-rigid polymer light pipe 206 is manufactured from nitrile. In still another embodiment, the semi-rigid polymer light pipe 206 is manufactured from latex. Other materials suitable for manufacturing the semi-rigid polymer light pipe 206 will be obvious to those of ordinary skill in the art having the benefit of this disclosure.

In this illustrative embodiment, the semi-rigid polymer light pipe 206 comprises a continuous band disposed along the rear surface 205 of the electronic device 100. By being a "continuous band," the semi-rigid polymer light pipe 206 is manufactured as an annular ring defining a perimeter having an interior and an exterior, with the continuous loop itself having no beginning and no end. While being a continuous loop in this illustrative embodiment, embodiments of the disclosure are not so limited. In another embodiment the semi-rigid polymer light pipe 206 can be manufactured as one or more linear or non-linear strips, one or more interlaced linear or non-linear strips, a matrix of linear or non-linear strips, or in other configurations.

In this illustrative embodiment, the semi-rigid polymer light pipe 206 is obround. As the term "obround" is commonly understood in the English language, this is a shape where two semicircles 208,210 are connected by parallel lines 207,209 tangent to the endpoints of the semicircles 208,210. In one or more embodiments, the obround is between 120 and 130 millimeters in length. For example, in one embodiment the obround is about 126 millimeters in length. In one or more embodiments, the obround is between 30 and 35 millimeters in width. For example, in one embodiment the obround is about 32 millimeters in width. Other dimensions for the obround will be obvious to those of ordinary skill in the art having the benefit of this disclosure.

While an obround is one suitable shape for the semi-rigid polymer light pipe 206, the semi-rigid polymer light pipe 206 can take other shapes as well. In another embodiment, the semi-rigid polymer light pipe 206 is round. In another embodiment, the semi-rigid polymer light pipe 206 is ovular. In another embodiment, the semi-rigid polymer light pipe 206 is rectangular. In another embodiment, the semi-rigid polymer light pipe 206 is polygonal. In another embodiment, the semi-rigid polymer light pipe 206 is a free form shape. Still other shapes for the semi-rigid polymer light pipe 206 will be obvious to those of ordinary skill in the art having the benefit of this disclosure.

As best shown in the side elevation view 203, in one or more embodiments at least a portion 211 of the semi-rigid polymer light pipe 206 extends distally beyond the rear surface 205 of the electronic device 100. This results in a distal edge 212 of the semi-rigid polymer light pipe 206 being raised above the rear surface 205 of the electronic device 100.

The fact that the distal edge 212 of the semi-rigid polymer light pipe 206 is raised above the rear surface 205 of the electronic device 100 offers several advantages. First, it allows the semi-rigid polymer light pipe 206 to serve as a stand for the electronic device 100 as will be described below with reference to FIGS. 10-11. Second, it allows the semi-rigid polymer light pipe 206 to provide vibrational isolation between the rear surface 205 of the electronic device 100 and any supporting surface. This enhances the performance of audio output devices, as will also be described below with reference to FIGS. 10-11. Third, it allows the semi-rigid polymer light pipe 206 to frictionally resist movement of the housing 101 when the semi-rigid polymer light pipe 205 is in contact with a supporting surface. Other advantages will be obvious to those of ordinary skill in the art having the benefit of this disclosure.

Figure 3:
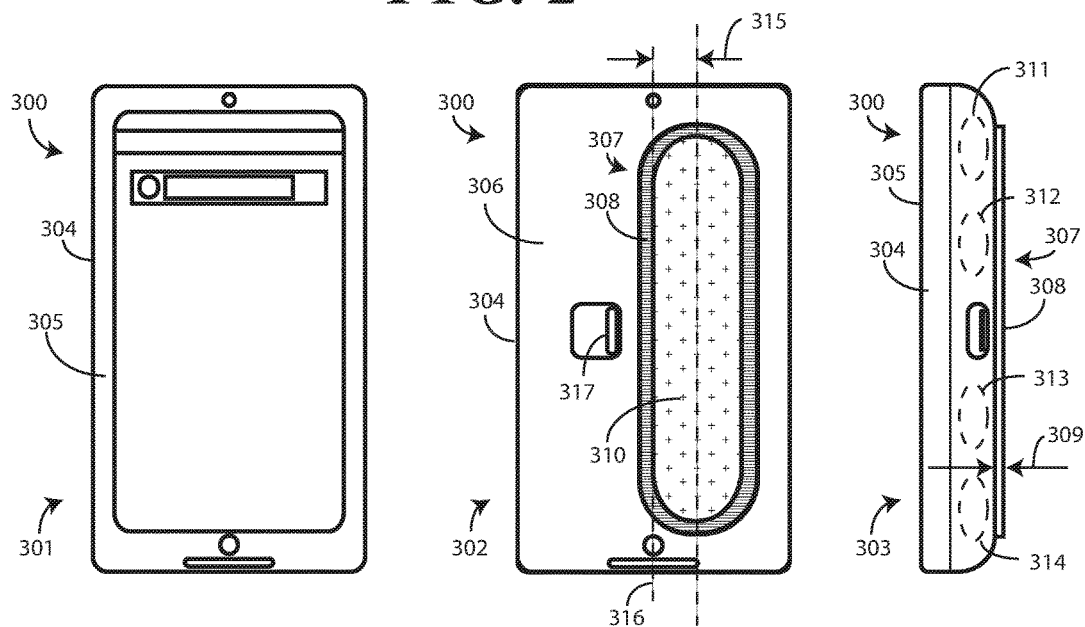
FIG. 3 illustrates front, side, and rear elevation views of another explanatory electronic device in accordance with one or more embodiments of the disclosure.

Turning now to FIG. 3, illustrated therein is a front elevation view 301, a rear elevation view 302, and a side elevation view 303 of another electronic device 300 configured in accordance with one or more embodiments of the disclosure. As with the electronic device (100) of FIGS. 1-2, the electronic device 300 includes a housing 304. The housing 304 includes a front surface 305 and a rear surface 306. While the rear surface (205) of the electronic device (100) of FIGS. 1-2 was substantially planar, the rear surface 306 of the electronic device 300 of FIG. 3 is at least partially convex.

As before, an illuminative output device 307 is disposed along the rear surface 306. In this illustrative embodiment, the illuminative output device 307 comprises a semi-rigid polymer light pipe 308. In this illustrative embodiment, in contrast to that of FIG. 2 above, the semi-rigid polymer light pipe 308 is offset 315 from a central axis 316 of the electronic device 300. This can be done for stylistic reasons in one embodiment. In other embodiments, this can be done to accommodate additional components along the rear surface 306 of the electronic device 300, such as the charging port 317 shown in FIG. 3.

Here, the semi-rigid polymer light pipe 308 is configured as a ring. In this illustrative embodiment, the semi-rigid polymer light pipe 308 comprises a continuous band shaped as an obround. However, as before, other shapes and configurations of the semi-rigid polymer light pipe 308 can be used and will be obvious to those of ordinary skill in the art having the benefit of this disclosure.

In this embodiment, the rear surface 306 of the housing 304 of the electronic device 300 is convex exterior of a perimeter of the semi-rigid polymer light pipe 308. At least a portion 309 of the semi-rigid polymer light pipe 308 extends outwardly beyond the convex major surface defining the majority of the rear surface 306. However, in this embodiment the rear surface 306 is planar or substantially planer interior of the semi-rigid polymer light pipe 308. In this embodiment, a substantially planar housing member 310 is coupled to and seals an interior of the semi-rigid polymer light pipe 308.

Having the rear surface 306 of the housing 304 of the electronic device 300 be convex exterior of a perimeter of the semi-rigid polymer light pipe 308 offers advantages in certain applications. Illustrating by example, in one or more embodiments one or more loudspeakers 311,312,313,314 can be positioned exterior of the semi-rigid polymer light pipe 308 along the convex portion of the rear surface 306 of the housing 304. When the rear surface 306 is placed upon a supporting surface, such as a table, with the front surface 305 of the electronic device 300 facing upward such that a direction of gravity extends from the front surface 305 through and outwardly from the rear surface 306 through the semi-rigid polymer light pipe 308, with the semi-rigid polymer light pipe 308 in contact with the table, the semi-rigid polymer light pipe 308 provides an acoustically isolating component positioned between the table and the rear surface 306 of the housing 304. When the one or more loudspeakers 311,312,313,314 are active, i.e., when they are delivering music or other acoustic output, the one or more loudspeakers 311,312,313,314 and housing 304 can vibrate in concert with each other, but without those vibrations translating to the table. This prevents rattles, sub-optimal loudspeaker performance, and other acoustic maladies.

When in this position, i.e., when the rear surface 306 is placed upon a supporting surface with the front surface 305 of the electronic device 300 facing upward such that a direction of gravity extends from the front surface 305 through and outwardly from the rear surface 306 through the semi-rigid polymer light pipe 308, with the semi-rigid polymer light pipe 308 in contact with the table, the semi-rigid polymer light pipe 308 performs other functions as well. Illustrating by example, the semi-rigid polymer light pipe 308 precludes rotation of the convex portion of the rear surface 306 of the housing 304, thereby supporting the electronic device 300 above the surface of the table.

Moreover, recall that the semi-rigid polymer light pipe 308 functions primarily as an illuminative output device. The inclusion of convex portions of the rear surface 306 of the housing 304 allows light emanating from the semi-rigid polymer light pipe 308 to be readily seen by a user. With the electronic device (200) of FIG. 2 and its planar rear surface (205), one can still see the light, as the rear surface (205) is raised above the table by way of the semi-rigid polymer light pipe (206) and the light emanating from the semi-rigid polymer light pipe (206) reflects between the table and rear surface (205) outwardly where it can be seen by a user. However, the inclusion of convex portions of the rear surface 306 of the housing 304 allows light emanating from the semi-rigid polymer light pipe 308 to be seen directly from a vastly greater number of viewing angles. This will be shown in more detail below with reference to FIG. 11.

Figure 4:
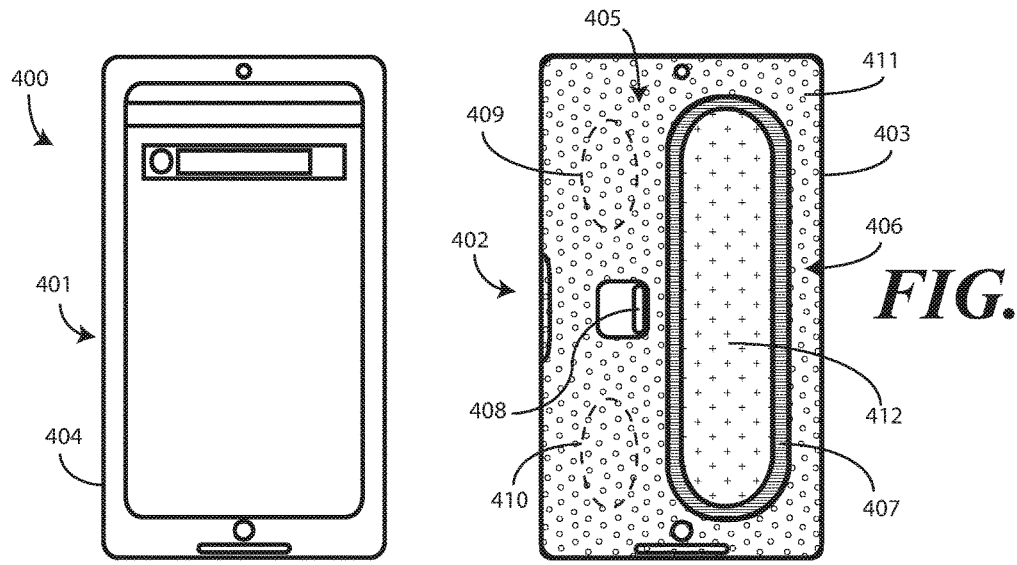
FIG. 4 illustrates an explanatory modular system in accordance with one or more embodiments of the disclosure.

The electronic devices of FIGS. 2 and 3 are stand-alone electronic devices, in that each device is configured as a singular, integrated unit. However, as noted above, in one or more embodiments electronic devices can be configured to be selectively attachable and detachable from an attachment. Turning now to FIG. 4, illustrated therein is such an embodiment.

Illustrated in FIG. 4 is one explanatory modular system 400 in accordance with one or more embodiments of the disclosure. In one or more embodiments, the modular system 400 includes an electronic device 401 and an attachment 402. In one or more embodiments, the attachment 402 can be selectively attached to, or detached from, the electronic device 100 or an electronic device module.

The principal components of the electronic device 401 are the same as that which explained above with reference to FIG. 1. Accordingly, attention will now be directed to the attachment 402. In one or more embodiments, the attachment 402 includes a housing 403. In one or more embodiments, the housing 403 is selectively attachable to the electronic device 100 by one or more coupling devices, examples of which will be explained in more detail below with reference to FIGS. 6-7.

In one or more embodiments, the housing 403 of the attachment 402 can be mechanically attached to the electronic device 401. For example, mechanical clasps for the attachment 402 can be configured to wrap about, or engage, the housing 404 of the electronic device 401, thereby retaining the attachment 402 against a surface of the housing 404. Such clasps permit the attachment 402 to be completely detached from the electronic device 401 and treated as an accessory.

In another embodiment, when not in use, the attachment 402 may be mechanically retained to the electronic device 401 by a lanyard or similar device. Such a configuration helps to prevent inadvertent loss of the attachment 402 when detached from the housing 404 of the electronic device 401.

In yet another embodiment, the attachment 402 may be coupled to the electronic device 401 by a hook and slider mechanism so as to be detachable from the housing 404 yet non-detachable from the electronic device 401 itself. Other attachment mechanisms include magnetic couplings, snaps, protective casing couplings, boot couplings, static attachment connectors, vertical locators, horizontal locators, and the like. Some of these various mechanical configurations will be illustrated in more detail below. These mechanical embodiments are intended to be illustrative only. As an alternate to mechanical attachments, the attachment 402 can be attached to the housing 404 using static adhesion, mechanical suction, or in other ways.

In one or more embodiments, the housing 403 of the attachment 402 includes a rear surface 405. As with the electronic device (300) of FIG. 3, the rear surface 405 of the attachment 402 is at least partially convex.

In one or more embodiments, the rear surface 405 comprises an illuminative output device 406 is disposed therealong. In one or more embodiments, the illuminative output device 406 comprises a semi-rigid polymer light pipe 407. In one or more embodiments, the semi-rigid polymer light pipe 407 is offset from a central axis of the attachment 402 to accommodate a charging port 408. In other embodiments, the semi-rigid polymer light pipe 407 is centrally disposed along the rear surface 405 of the attachment 402. Other configurations will be obvious to those of ordinary skill in the art having the benefit of this disclosure.

In this illustrative embodiment, the semi-rigid polymer light pipe 407 comprises a continuous band shaped as an obround. However, as before, other shapes and configurations of the semi-rigid polymer light pipe 407 can be used and will be obvious to those of ordinary skill in the art having the benefit of this disclosure.

In this embodiment, the rear surface 405 of the housing 403 of the attachment 402 is convex exterior of a perimeter of the semi-rigid polymer light pipe 407. As in previous embodiments, at least a portion of the semi-rigid polymer light pipe 407 extends outwardly beyond the convex major surface defining the majority of the rear surface 405. However, in this embodiment the rear surface 405 is planar or substantially planer interior of the semi-rigid polymer light pipe 407 due to the fact that a substantially planar housing member 411 is coupled to and seals an interior of the semi-rigid polymer light pipe 407.

In one or more embodiments one or more loudspeakers 409,410 are situated exterior of the semi-rigid polymer light pipe 407 along the convex portion of the rear surface 405 of the housing 403. Here, the one or more loudspeakers 409, 410 are covered with an acoustically transmissive covering 411 such as a fabric or mesh layer such that sound can propagate through the acoustically transmissive covering 411 and out of the attachment 402.

When the rear surface 405 of the attachment 402 is placed upon a supporting surface, such as a table, with the electronic device 401 to which it is coupled facing upward such that a direction of gravity extends from the electronic device 401 through and outwardly from the rear surface 405 of the housing 403 of the attachment 402 and through the semi-rigid polymer light pipe 407, with the semi-rigid polymer light pipe 407 in contact with the table, the semi-rigid polymer light pipe 407 provides an acoustically isolating component positioned between the table and the rear surface 405 of the housing 403 of the attachment 402. This allows sound from the one or more loudspeakers 409,410 and light from the semi-rigid polymer light pipe 407 to be heard and seen, respectively, by a user without interference. When in this position, the semi-rigid polymer light pipe 407 precludes rotation of the convex portion of the rear surface 405 of the housing 403 of the attachment 402 as well.

In one or more embodiments, the electronic device 401 and the attachment 402 can include complementary or common components. For example, the electronic device 401 and attachment 402 may both include components for receiving user input, such as loudspeakers, microphones, earpiece speakers, and the like. When such components are included in the attachment 402 and the electronic device 401, a user can—for example—deliver voice input to a microphone disposed in the electronic device 401 or the attachment 402. An electrical connection therebetween can deliver user input received by the attachment 402 to the electronic device 401.

The attachment 402 can be equipped with additional features as well. Illustrating by example, in one or more embodiments the attachment 402 can include a camera or other device to enhance electronic device operation. The camera can be carried on the housing 403 of the attachment 402 to provide an enhanced feature for the electronic device 401 in one or more embodiments. In other embodiments where the electronic device 401 may include its own rear-facing camera, the camera of the attachment 402 may be accompanied by an aperture to allow a sight line for the rear-facing camera of the electronic device 401.

These various options are included to demonstrate the numerous features and devices that can be incorporated into the attachment 402 beyond just the one or more loudspeakers 409,410. However, in some embodiments the attachment 402 will carry only acoustic components, such as the one or more loudspeakers 409,410, one or more microphones, and corresponding acoustic processing circuitry. The various combinations and permutations of features to include within the attachment 402 beyond the one or more loudspeakers 409,410 will be obvious to those of ordinary skill in the art having the benefit of this disclosure.

Figure 5:
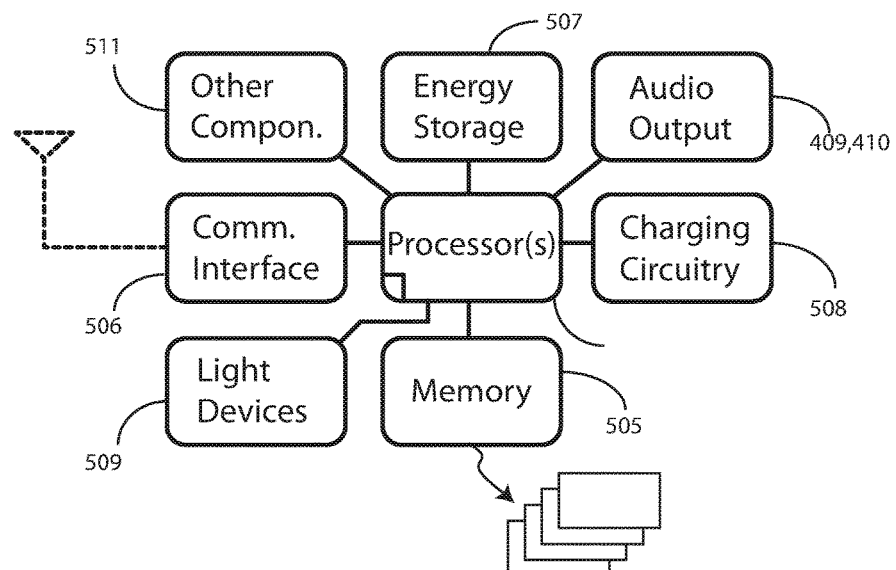
FIG. 5 illustrates a schematic block diagram of one explanatory attachment in accordance with one or more embodiments of the disclosure.

Turning now to FIG. 5, illustrated therein are additional components that may be included in attachments configured in accordance with one or more embodiments of the disclosure. The components can be included in various combinations, with some attachments including more components, while other attachments include fewer components, and so forth. Said differently, FIG. 5 shows only one explanatory component group forming part of an environment within which aspects of the present disclosure may be implemented. It will be appreciated that additional or alternative components may be used in a given implementation depending upon user preference, component availability, price point, and other considerations. All or some of the components communicate with one another by way of one or more shared or dedicated internal communication links, such as an internal bus.

In one or more embodiments, an attachment can include, in addition to one or more loudspeakers 409,410, a control circuit 504, a memory 505, a communication interface 506, one or more light emitting devices 509, an energy source 507 or storage device, charging circuitry 508, and one or more other components 511.

The control circuit 504 may be any of a microprocessor, microcomputer, application-specific integrated circuit, or the like, and is operable with the one or more light emitting devices 509, which comprise one or more light emitting diodes in one or more embodiments. In one or more embodiments, the control circuit 504 is operable to independently actuate the one or more light emitting devices to deliver status indications to a user. The actuation of the one or more light emitting devices 509 delivers system status indications via light to a user. Such status indications can be via color of light, location of light along the output, frequency of flashing, or by other manipulations of the light.

The memory 505 may reside on the same integrated circuit as the control circuit 504, or alternatively may be a separate component. The memory 505 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 1005 may include a read only memory (i.e., a hard drive, flash memory or any other desired type of memory device).

Information that is stored by the memory 505 can include program code associated with operating the one or more light emitting devices 509, receiving information to control the one or more light emitting devices 509, or to other informational data, e.g., program parameters, process data, etc. The operation of the control circuit 504 can be in accordance with executable instructions stored in a non-transitory computer readable medium (e.g., memory 505) to control basic functions of the attachment and its one or more light emitting devices 509. Such functions may include, for example, turning the one or more light emitting devices 509 ON and OFF, moving the light emitted by the one or more light emitting devices 509 between a first location and a second location along the semi-rigid polymer light pipe (407), and other operations as well.

In one or more embodiments, the control circuit 504 is programmed to interact with the other components of the attachment to perform certain functions. The control circuit 504 may include or implement various modules and execute programs for initiating different activities. The communication interface 506 can be used for communication with an electronic device with which an attachment including this component group is attached.

For example, where an electronic device includes a connector array that mates with a mating connector array of the attachment, the communication interface 506 can be responsible for sending and receiving electrical signals between the electronic device and the attachment using the connector array and the mating connector array. These electrical signals can include signals from a temperature sensor indicating when or how the one or more light emitting devices 509 should be actuated, whether the electronic device is operating in a predefined mode of operation that requires a certain operational state of the one or more light emitting devices 509, and so forth. Other electrical signals handled by the communication interface 506 will be obvious to those of ordinary skill in the art having the benefit of this disclosure.

In one or more embodiments, the attachment may include its own energy source 507 with which the control circuit 504, and/or other components can be powered. The inclusion of a dedicated energy source 507 prevents draining the energy source of the electronic device to energize the one or more loudspeakers 409,410 and/or one or more light emitting devices 509, thereby extending runtime of the electronic device when the attachment is coupled thereto. The energy source 507 can include a battery or fuel cell for providing power to the one or more loudspeakers 409,410 and/or one or more light emitting devices 509 and their corresponding components.

Figure 6:
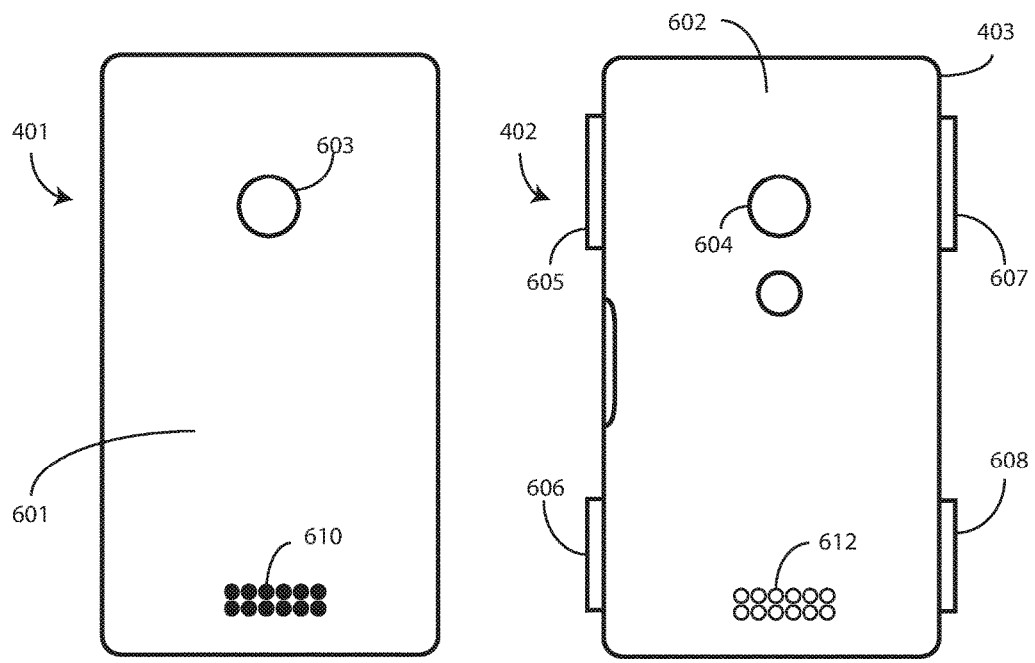
FIG. 6 illustrates one explanatory modular system in accordance with one or more embodiments of the disclosure.
Figure 7:
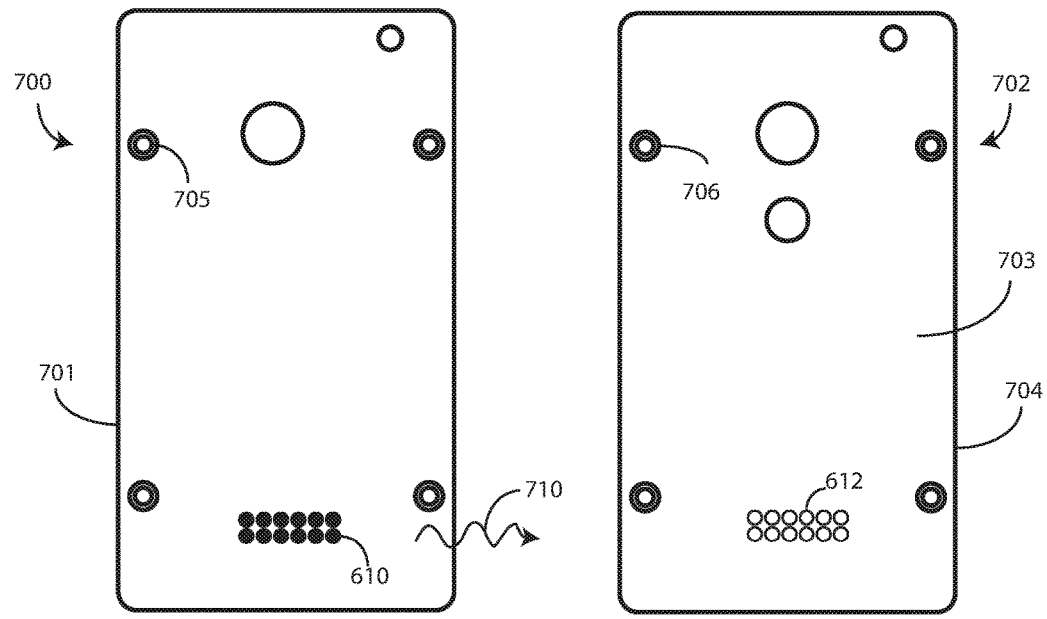
FIG. 7 illustrates another explanatory modular system in accordance with one or more embodiments of the disclosure.

Turning now to FIGS. 6 and 7, illustrated therein are examples of various ways in which an attachment 402 can be coupled to an electronic device 401 in accordance with one or more embodiments of the disclosure. As noted above, in one or more embodiments of the disclosure, the attachment 402 can be coupled to the electronic device 401 by mechanical, magnetic, suction, static, and other techniques.

Beginning with FIG. 6, illustrated therein is the backside 601 of the electronic device 401 and the front side 602 of one explanatory attachment 402 configured in accordance with one or more embodiments of the disclosure. The backside 601 of the electronic device 401 defines a major face of the electronic device 401. The front side 602 of the attachment 402, which defines a major face of the attachment 402, can be selectively attachable to this major face of the electronic device 401 in one or more embodiments.

As shown in FIG. 6, the backside 601 of the electronic device 401 includes a rear-facing camera 603. In one or more embodiments, the attachment 402 includes a recess 604 into which the rear-facing camera 603 may situate when the attachment 402 is attached to the electronic device 401. Alternatively, instead of a recess 604, the attachment 402 may include an aperture where the recess 604 is located and through which light may pass to the rear-facing camera 603 when the attachment 402 is coupled to the back side 601 of the electronic device 401.

In one or more embodiments, the housing 403 of the attachment 402 can be mechanically attached to the electronic device 401 or an electronic device module by one or more coupling devices. In this illustrative embodiment, the coupling devices comprise mechanical clasps 605,606,607, 608 that are configured to wrap about, or engage, the housing 404 of the electronic device 401, thereby retaining the attachment 402 against the major surface defined by the back side 601 of the housing 404. Such mechanical clasps 605,606,607,608 permit the attachment 402 to be completely detached from the electronic device 401 and treated as a separate accessory.

Turning now to FIG. 7, another coupling system is shown. As shown in FIG. 7, a backside 701 of another electronic device 700 is selectively attachable to a front side 703 of another explanatory attachment 702 configured in accordance with one or more embodiments of the disclosure. As with the embodiment of FIG. 6, the attachment 702 on FIG. 7 includes a housing 704.

In the illustrative embodiment of FIG. 7, the backside 701 of the electronic device 700 includes one or more alignment features 705 configured and placed to mate with complementary mating features 706 on the front side 703 of the attachment 702. In one or more embodiments, the alignment features 705 and complementary mating features 707 are magnetic such that the front side 703 of the attachment 702 can be magnetically adhered to the backside 701 of the electronic device 700.

In addition to the mechanical coupling described above with reference to FIG. 6, and the magnetic coupling described here, attachments configured in accordance with one or more embodiments of the disclosure can be coupled to electronic devices in other ways as well. These include snaps, protective casing couplings, boot couplings, static attachment connectors, vertical locators, horizontal locators, static adhesion devices, mechanical suction devices, or other devices.

Referring now to both FIGS. 6 and 7, to further illustrate the flexibility with which attachments can be designed in accordance with embodiments of the disclosure, in one embodiment the backside 601,701 of the electronic device 401,700 includes a connector array 610. The connector array 610 is located and configured to mate with a mating connector array 612 on the front side 602,703 of the attachment 402,702. Electrical signals 710 can be communicated between the electronic device 401,700 and the attachment 402,702 using the connector array 610 and the mating connector array 612. Illustrating by example, in one or more embodiments the one or more processors of the electronic device 401,700 can selectively actuate the one or more loudspeakers (409,410) and/or the one or more light emitting devices (509) of the attachment 402,702 in one or more embodiments. Other uses for the electrical signals will be obvious to those of ordinary skill in the art having the benefit of this disclosure.

Figure 8:
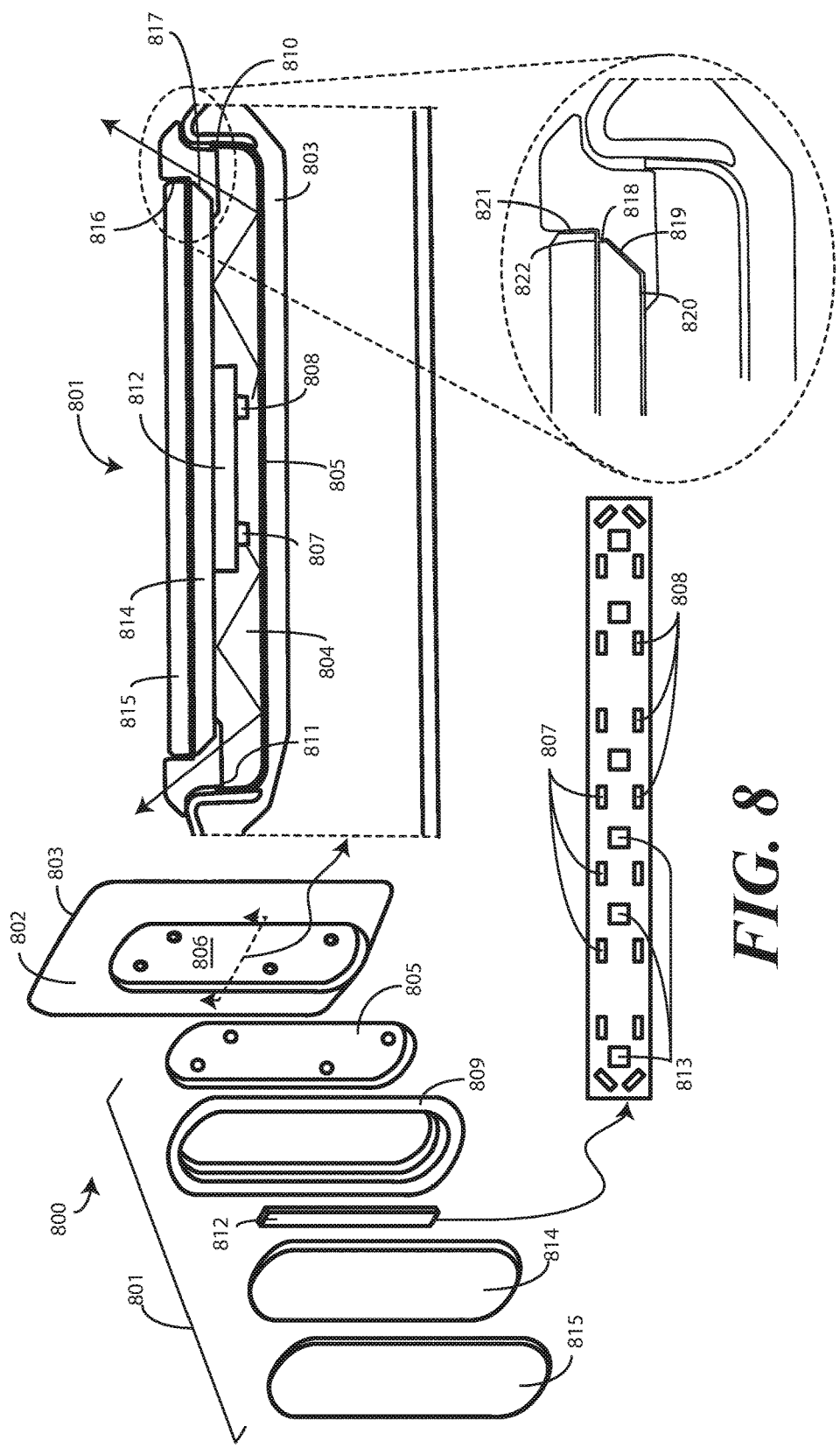
FIG. 8 illustrates exploded and sectional views of one explanatory electronic device in accordance with one or more embodiments of the disclosure.

Turning now to FIG. 8, illustrated therein is a sectional view of a portion of an electronic device 800 at which an illuminative output 801 configured in accordance with one or more embodiments of the disclosure is located. The electronic device 800 could be configured as a standalone electronic device, as described above with reference to FIGS. 1-3, or as an attachment for an electronic device in a modular system as described with reference to FIGS. 4-7.

In one or more embodiments, the rear surface 802 of the housing 803 of the electronic device 800 includes a cavity 804. In this illustrative embodiment, the rear surface 802 is convex exterior of the cavity 804.

In one or more embodiments, situated in, and lining, the cavity is a reflective layer 805. In one embodiment, the reflective layer 805 comprises a white polyethylene terephthalate (PET) sheet having a thickness of about 0.17 millimeters lines the interior surface 806 of the cavity 804. While PET is one suitable material for the reflective layer 805, others can be used as well. In another embodiment, for example, the reflective layer 805 comprises polyester. In another embodiment, the reflective layer 805 comprises a reflective film. Other materials suitable for use as the reflective layer 805 will be obvious to those of ordinary skill in the art having the benefit of this disclosure. As described below, this reflective layer 805 helps to redirect light from one or more light emitting devices 807,808 through the cavity 804 and outward from the housing 803 through the semi-rigid polymer light pipe ring 809.

Once the reflective layer 805 is situated within the cavity 804 so as to cover its interior surface 806, the semi-rigid polymer light pipe ring 809 is positioned about the perimeter of the cavity 804. Since both the perimeter of the cavity 804 and the semi-rigid polymer light pipe ring 809 are annular in this embodiment, with the semi-rigid polymer light pipe ring 809 configured as a continuous band, the continuous band of the semi-rigid polymer light pipe ring 809 spans the perimeter of the cavity 804. As shown in the sectional view, corners of the semi-rigid polymer light pipe ring 809 can be used to retain the reflective layer 805 within the cavity 804 in one or more embodiments.

In one or more embodiments, the one or more light emitting devices 807,808 comprise light emitting diodes. In this illustrative embodiment, the one or more light emitting devices 807,808 are coupled to a substrate 812. The substrate 812 can comprise a printed circuit board, a flexible circuit substrate or other substrate. In this illustrative embodiment, one or more light emitting device drivers 813 and other corresponding circuitry can be coupled to the substrate 812 as well.

As shown in the sectional view, in this illustrative embodiment the substrate 812 is disposed within the cavity 804, with the one or more light emitting devices 807,808 disposed between the substrate 812 and the reflective layer 805, with an air gap disposed between the one or more light emitting devices 807,808 and the reflective layer 805.

In this illustrative embodiment, the substrate 812 is coupled to a substrate carrier 814. In one or more embodiments, the substrate carrier 814 is manufactured from plastic. However, metal or other materials can be used to manufacture the substrate carrier 814. In this illustrative embodiment, the substrate carrier 814 is disposed between the substrate 812 and a planar housing member 815. As with the substrate carrier, in one or more embodiments the planar housing member 815 is manufactured from plastic. However, metal or other materials can be used to manufacture the planar housing member 815. In this illustrative embodiment, the planar housing member 815 is manufactured from aluminum, thereby defining a decorative and aesthetically pleasing plate positioned along the rear surface 802 of the electronic device 800 interior of the semi-rigid polymer light pipe ring 809.

As shown in the sectional view, in one or more embodiments the planar housing member 815 is coupled to and seals an interior of the semi-rigid polymer light pipe ring 809. The semi-rigid polymer light pipe ring 809 defines a first annular receiver 816 into which the planar housing member 815 is positioned. The first annular receiver 816 of this illustrative embodiment spans at least two sides 821,822 of the planar housing member 815 in this illustrative embodiment.

The planar housing member 815 can be adhesively affixed to the semi-rigid polymer light pipe ring 809 in one or more embodiments. However, where the semi-rigid polymer light pipe ring 809 is manufactured from silicone, the planar housing member 815 can be frictionally retained within the interior of the semi-rigid polymer light pipe ring 809 as well. Other techniques for coupling the planar housing member 815 to the semi-rigid polymer light pipe ring 809 will be obvious to those of ordinary skill in the art having the benefit of this disclosure.

In addition to the semi-rigid polymer light pipe ring 809 defining the annular receiver 816 for the planar housing member 815, in this illustrative embodiment the semi-rigid polymer light pipe ring 809 defines a second annular receiver 817 for the substrate carrier 814. Here, the diameter of the second annular receiver 817 is narrower than the diameter of the annular receiver 816 for the planar housing member 815. In this illustrative embodiment, to mechanically retain the substrate carrier 814 within the second annular receiver 817 without the need of adhesives, the second annular receiver 817 is coupled to at least three sides 818,819,820 of the substrate carrier 814. In other embodiments, the second annular receiver 817 can be coupled to two or one sides of the substrate carrier 814. Where this is the case, adhesive or other coupling techniques can be used to couple the substrate carrier 814 to the semi-rigid polymer light pipe ring 809.

Once the components are assembled, as shown in the sectional view the reflective layer 805 is disposed along and spans a base of the cavity 804. When the one or more light emitting devices 807,808 are actuated, the reflective layer and the substrate carrier 814 reflect light through the cavity until to the semi-rigid polymer light pipe ring 809. The semi-rigid polymer light pipe ring 809 then redirects the light outwardly from the housing 803.

Figure 9:
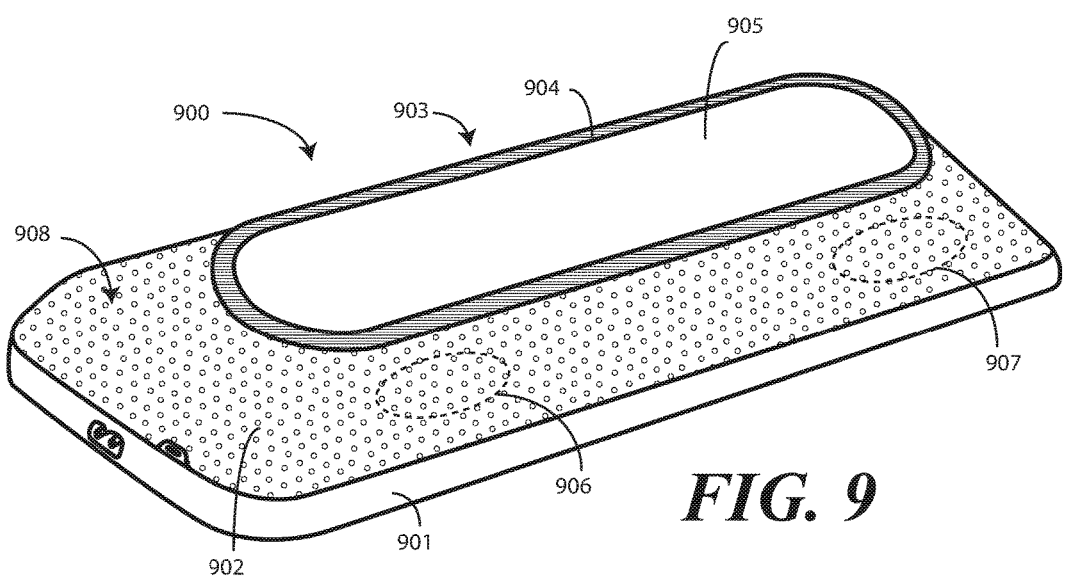
FIG. 9 illustrates a first perspective view of one explanatory attachment in accordance with one or more embodiments of the disclosure.
Figure 10:
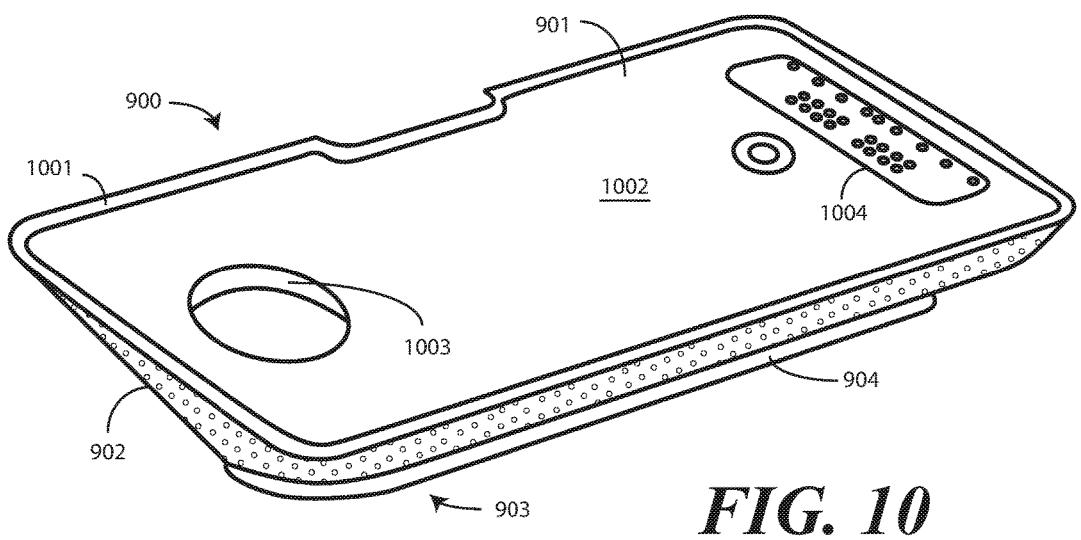
FIG. 10 illustrates a second perspective view of one explanatory attachment in accordance with one or more embodiments of the disclosure.

Turning now to FIGS. 9 and 10, illustrated therein is one explanatory attachment 900 configured in accordance with one or more embodiments of the disclosure. As described above with reference to FIGS. 4-7, in one or more embodiments the attachment 900 can be selectively attached to, or detached from, an electronic device or an electronic device module.

In one or more embodiments, the attachment 900 includes a housing 901. In one or more embodiments, the housing 901 is selectively attachable to an electronic device by one or more coupling devices, shown here as a continuous perimeter boot coupling 1001. The continuous perimeter boot coupling 1001 is a mechanical coupling that wraps about the housing of an electronic device to retain the attachment 900 thereto. The continuous perimeter boot coupling 1001 allows the attachment 900 to be completely detached from the electronic device when not in use. As noted above, other attachment mechanisms such as magnetic couplings, snaps, protective casing couplings, boot couplings, static attachment connectors, vertical locators, horizontal locators, and the like can be substituted for the perimeter boot coupling 1001.

In one or more embodiments, the housing 901 of the attachment 900 includes a rear surface 902. In this illustrative embodiment, the rear surface 902 of the attachment 900 is at least partially convex. An illuminative output device 903 is disposed on the rear surface 902 of the attachment 900 in this embodiment. The illuminative output device 903 comprises a semi-rigid polymer light pipe 904. In this illustrative embodiment, the semi-rigid polymer light pipe 904 is offset from a central axis of the attachment 900. In other embodiments, the semi-rigid polymer light pipe 904 is centrally disposed along the rear surface 902 of the attachment 900.

In this embodiment, the rear surface 902 of the housing 901 of the attachment 900 is convex exterior of a perimeter of the semi-rigid polymer light pipe 904. As in previous embodiments, at least a portion of the semi-rigid polymer light pipe 904 extends outwardly beyond the convex major surface defining the majority of the rear surface 902, as is best seen in FIG. 10. In this embodiment the rear surface 902 is planar or substantially planer interior of the semi-rigid polymer light pipe 904 due to the fact that a substantially planar housing member 905 is coupled to and seals an interior of the semi-rigid polymer light pipe 904.

In one or more embodiments one or more loudspeakers 906,907 are situated exterior of the semi-rigid polymer light pipe 904 along the convex portion of the rear surface 902 of the housing 901. Here, the one or more loudspeakers 906, 907 are covered with an acoustically transmissive covering 908 such as a fabric or mesh layer such that sound can propagate through the acoustically transmissive covering 908 and out of the attachment 900.

In this illustrative embodiment, the backside 1002 of the attachment 900 includes a recess 1003 into which a rear-facing camera of an electronic device may situate when the attachment 900 is attached to the electronic device. In one embodiment, the backside 1002 of the attachment 900 includes a connector array 1004. The connector array 1004 is located and configured to mate with a mating connector array of an electronic device. Electrical signals can be exchanged between the electronic device and the attachment 900 using the connector array 1004 and the mating connector array as previously described.

Figure 11:
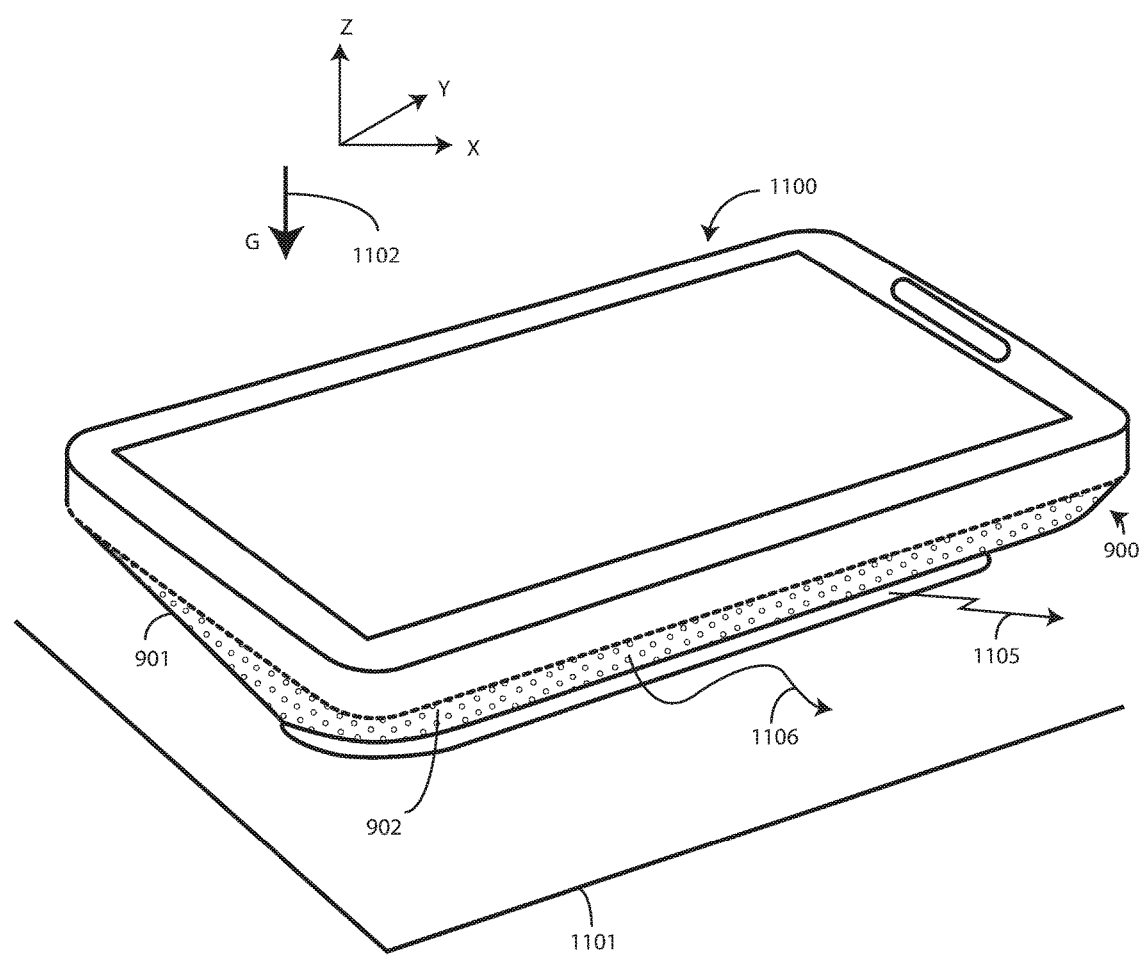
FIG. 11 illustrates one explanatory modular system in accordance with one or more embodiments of the disclosure.

Turning now to FIG. 11, the attachment 900 has been coupled to an electronic device 1100. The combined system has been placed on a supportive surface 1101, which is a table in this illustration. While shown for illustrative purposes as a modular system, the description below would apply to a standalone electronic device, described above with reference to FIGS. 1-3, as well.

In this illustrative embodiment, the attachment 900 is positioned between the table and the electronic device 1100, with the semi-rigid polymer light pipe 904 contacting the table such that a direction of gravity 1102 runs from the electronic device 1100 through the attachment 900 and outwardly from the housing 901 of the attachment through the semi-rigid polymer light pipe 904.

In this configuration, the semi-rigid polymer light pipe 904 precludes rotation of the convex portion of the rear surface 902 of the housing 901 of the attachment 900. The semi-rigid polymer light pipe 904 provides a "stand" for the combined system. This stand supports the attachment 900 and its convex outer surface above the table. The stand also supports the electronic device 1100 above the table as well.

In this configuration, one or more processors of the electronic device 1100 or the attachment 900 can selectively actuate one or more light emitting devices disposed within the attachment in accordance with a status or other criteria. The semi-rigid polymer light pipe 904 then receives this light 1105 as described above with reference to FIG. 8, and redirects the same outside of the housing. The fact that the rear surface 902 of the housing 901 of the attachment 900 is convex allows this light 1105 to be viewed from a wide variety of angles.

In addition to delivering light 1105, the semi-rigid polymer light pipe 904 also provides an acoustically isolating component positioned between the table and the rear surface 902 of the housing 901 of the attachment 900. This allows sound 1106 from the one or more loudspeakers (906,907) to be heard by a user without interference.

As shown in FIG. 11, embodiments of the disclosure advantageously provide an illuminative output device that can deliver device status indications via light to a user. Such status indications can be via color of light, location of light along the output, frequency of flashing, or by other manipulations of the light. However, as opposed to only serving as an optical output, the semi-rigid polymer light pipe 904 also provides vibration isolation for optimal acoustic performance of loudspeakers (906,907) and microphones of the system. In addition to this secondary benefit, the semi-rigid polymer light pipe 904 further functions as a stand for the system and both prevents slippage of the system along the table and support that maintains the housings of the system above the table as well.

The semi-rigid polymer light pipe 904 serves as a "support island" that holds the convex surface of the system above, and stably on, the supportive surface 1101. Music or other acoustic output delivered by the loudspeakers (906, 907) thus exits the convex housing without interference from the supportive surface 1101, thereby optimizing acoustic sound quality. Advantageously, in one or more embodiments the semi-rigid polymer light pipe 904 serves as a non-slip, vibration isolating, and illuminative notification stand for the system. These many features and advantages are all provided by the semi-rigid polymer light pipe 904, which itself provides a simple, elegant, compact, and cost-effective solution to several different problems.

Figure 12:
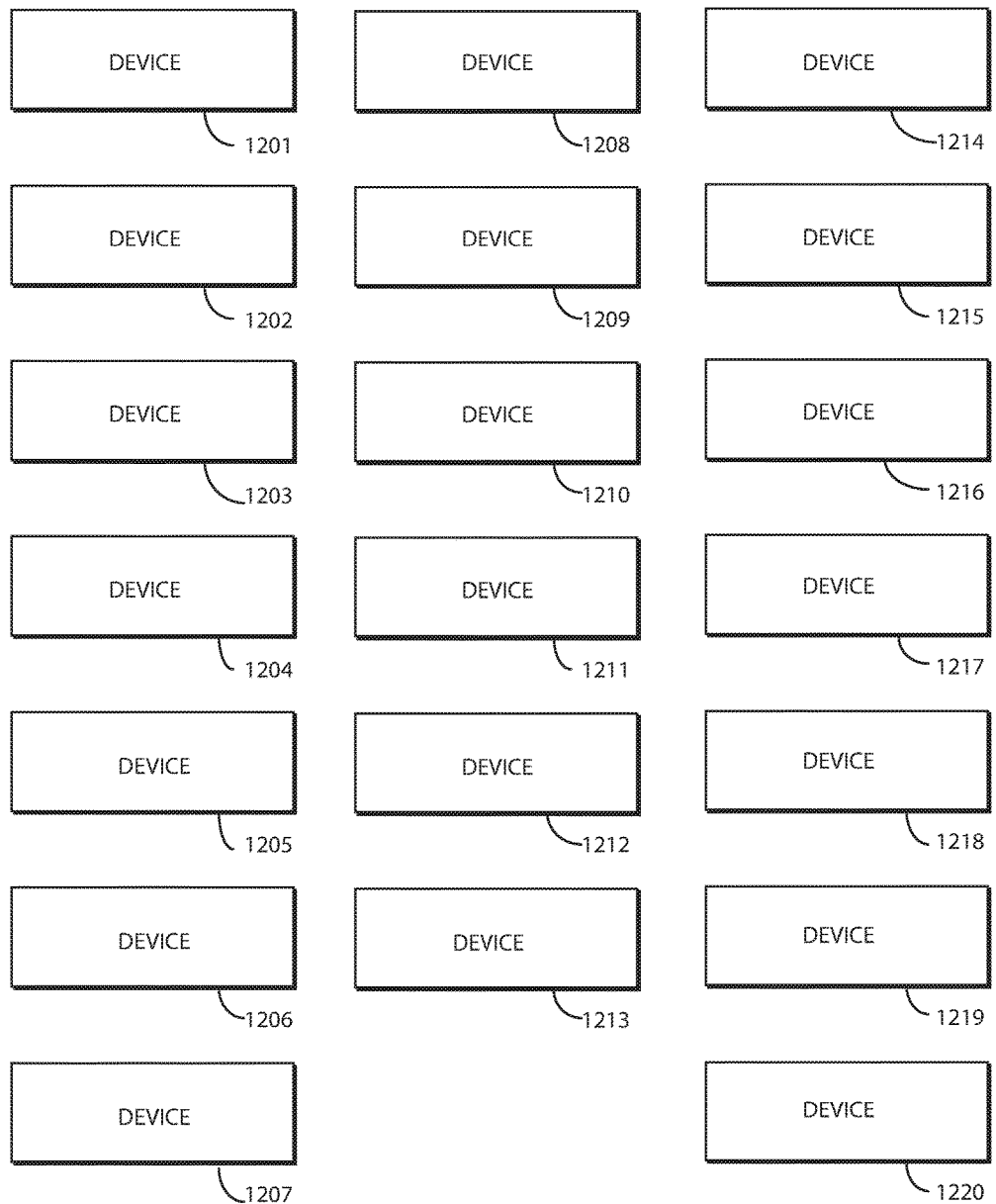
FIG. 12 illustrates various embodiments of the disclosure.

Turning now to FIG. 12, illustrated therein are various embodiments of the disclosure. At 1201, an electronic device comprises a housing having a front surface and a rear surface. At 1201, the electronic device comprises one or more light emitting devices disposed within the housing. At 1201, the electronic device comprises a semi-rigid polymer light pipe disposed along the rear surface, where at least a portion of the semi-rigid polymer light pipe extends distally beyond the rear surface. At 1201, the semi-rigid polymer light pipe directs light received from the one or more light emitting devices outside of the housing.

At 1202, the electronic device of 1201 is selectively attachable to another electronic device. At 1203, the semi-rigid polymer light pipe of 1201 defines a continuous band along the rear surface. At 1204, the continuous band of 1203 frictionally resists movement of the housing along a surface when the continuous band is in contact with the surface.

At 1205, the electronic device of 1204 further comprises one or more loudspeakers. At 1205, the continuous band acoustically isolates the one or more loudspeakers from the surface when the continuous band is in contact with the surface.

At 1206, a rear surface of the electric device of 1203 is convex exterior of a perimeter of the continuous band. At 1207, the rear surface of 1206 is planar interior of the perimeter of the continuous band.

At 1208, the rear surface of 1203 defines a cavity. At 1208, the one or more light emitting devices are coupled to a substrate disposed within the cavity. At 1208, the continuous band spans a perimeter of the cavity.

At 1209, the electronic device of 1208 further comprises a planar housing member, coupled to and sealing an interior of the continuous band. At 1210, the electronic device of 1209 further comprises a substrate carrier positioned between the substrate and the planar housing member.

At 1211, the continuous band of 1210 defines an annular receiver for the substrate carrier coupled to at least three sides of the substrate carrier. At 1212, the continuous band of 1211 defines another receiver for the planar housing member. At 1212, this other receiver is coupled to at least two sides of the planar housing member.

At 1213, the electronic device of 1208 further comprises a reflective layer disposed along a base of the cavity. At 1213, the reflective layer redirects the light received from the one or more light emitting devices to the continuous band. At 1214, the electronic device of 1213 further comprises an air gap between the one or more light emitting devices and the reflective layer.

At 1215, an electronic device comprises a housing. At 1215, the electronic device comprises a semi-rigid polymer light pipe ring positioned along, and extending outwardly beyond, a convex major surface of the housing. At 1214, the electronic device comprises a substantially planar housing member coupled to and sealing an interior of the semi-rigid polymer light pipe ring.

At 1216, when the semi-rigid polymer light pipe ring of 1215 is placed upon a planar surface, with a direction of gravity extending outwardly from the housing through the semi-rigid polymer light pipe ring, the semi-rigid polymer light pipe ring precludes rotation of the convex major surface relative to the planar surface.

At 1217, the electronic device of 1215 further comprises one or more processors. At 1217, the electronic device of 1215 further comprises one or more light emitting devices that are disposed within the electronic device and operable with the one or more processors. At 1217, the one or more processors selectively actuate the one or more light emitting devices. At 1217, the semi-rigid polymer light pipe ring directs light received from the one or more light emitting devices outside of the housing.

At 1218, an electronic device comprises a convex major surface defining a cavity. At 1218, the electronic device comprises a planar housing member. At 1218, the electronic device comprises a polymer light pipe ring positioned between, and extending distally above, the convex major surface and the planar housing member. At 1218, the electronic device comprises one or more light emitting devices coupled to a substrate positioned within the cavity. At 1218, the polymer light pipe ring directs light received from the one or more light emitting devices away from an exterior of the convex major surface.

At 1219, the electronic device of 1218 further comprises a reflective layer disposed along a base of the cavity. At 1219, the reflective layer redirects the light received from the one or more light emitting devices to the polymer light pipe ring. At 1220, the polymer light pipe ring of 1218 defines a stand for the electronic device supporting the convex major surface above a supporting surface when the polymer light pipe ring is placed on the supporting surface.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a housing comprising a front surface and a rear surface;
    one or more light emitting devices disposed within the housing; and
    a semi-rigid polymer light pipe disposed along the rear surface, where at least a portion of the semi-rigid polymer light pipe extends distally beyond the rear surface, the semi-rigid polymer light pipe directing light received from the one or more light emitting devices outside of the housing.

2. The electronic device of claim 1, wherein the front surface is selectively attachable to another electronic device.

3. The electronic device of claim 1, wherein the semi-rigid polymer light pipe defines a continuous band along the rear surface.

4. The electronic device of claim 3, the continuous band frictionally resisting movement of the housing along a surface when the continuous band is in contact with the surface.

5. The electronic device of claim 4, further comprising one or more loudspeakers, the continuous band acoustically isolating the one or more loudspeakers from the surface when the continuous band is in contact with the surface.

6. The electronic device of claim 3, wherein the rear surface is convex exterior of a perimeter of the continuous band.

7. The electronic device of claim 6, wherein the rear surface is planar interior of the perimeter of the continuous band.

8. The electronic device of claim 3, wherein:
the rear surface defines a cavity;
the one or more light emitting devices are coupled to a substrate disposed within the cavity; and
the continuous band spans a perimeter of the cavity.

9. The electronic device of claim 8, further comprising a planar housing member, coupled to and sealing an interior of the continuous band.

10. The electronic device of claim 9, further comprising a substrate carrier positioned between the substrate and the planar housing member.

11. The electronic device of claim 10, the continuous band defining an annular receiver for the substrate carrier coupled to at least three sides of the substrate carrier.

12. The electronic device of claim 11, the continuous band defining another receiver for the planar housing member, the another receiver coupled to at least two sides of the planar housing member.

13. The electronic device of claim 8, further comprising a reflective layer disposed along a base of the cavity, the reflective layer redirecting the light received from the one or more light emitting devices to the continuous band.

14. The electronic device of claim 13, further comprising an air gap between the one or more light emitting devices and the reflective layer.

15. An electronic device, comprising:
a housing;
a semi-rigid polymer light pipe ring positioned along, and extending outwardly beyond, a convex major surface of the housing; and
a substantially planar housing member coupled to and sealing an interior of the semi-rigid polymer light pipe ring.

16. The electronic device of claim 15, wherein when the semi-rigid polymer light pipe ring is placed upon a planar surface with a direction of gravity extending outwardly from the housing through the semi-rigid polymer light pipe ring, the semi-rigid polymer light pipe ring precludes rotation of the convex major surface relative to the planar surface.

17. The electronic device of claim 15, further comprising:
one or more processors; and
one or more light emitting devices, disposed within the electronic device and operable with the one or more processors;
the one or more processors selectively actuating the one or more light emitting devices and the semi-rigid polymer light pipe ring directing light received from the one or more light emitting devices outside of the housing.

18. An electronic device, comprising:
a convex major surface defining a cavity;
a planar housing member;
a polymer light pipe ring positioned between, and extending distally above, the convex major surface and the planar housing member; and
one or more light emitting devices coupled to a substrate positioned within the cavity;
the polymer light pipe ring directing light received from the one or more light emitting devices away from an exterior of the convex major surface.

19. The electronic device of claim 18, further comprising a reflective layer disposed along a base of the cavity, the reflective layer redirecting the light received from the one or more light emitting devices to the polymer light pipe ring.

20. The electronic device of claim 18, the polymer light pipe ring defining a stand for the electronic device supporting the convex major surface above a supporting surface when the polymer light pipe ring is placed on the supporting surface.

* * * * *